United States Patent
Hussary et al.

(10) Patent No.: US 6,258,402 B1
(45) Date of Patent: Jul. 10, 2001

(54) METHOD FOR REPAIRING SPRAY-FORMED STEEL TOOLING

(76) Inventors: Nakhleh Hussary, 918 A Essex Seet SE., Minneapolis, MN (US) 55414; Paul Earl Pergande, 20750 Smallwood Ct., Beverly Hills, MI (US) 48025; Robert Corbly McCune, 19275 Eldridge La., Southfield, MI (US) 48076

( * ) Notice: Subject to any disclaimer, the term of this patent is extended or adjusted under 35 U.S.C. 154(b) by 0 days.

(21) Appl. No.: 09/415,973

(22) Filed: Oct. 12, 1999

(51) Int. Cl.[7] .................................................. B05C 13/00
(52) U.S. Cl. ......................... 427/142; 427/140; 427/405; 427/456; 219/76.1; 219/76.12; 219/76.14; 228/119; 228/208; 228/261
(58) Field of Search ...................................... 427/140, 142, 427/405, 423, 427, 456, 580; 219/76.1, 76.12, 76.14; 228/119, 208, 261

(56) References Cited

U.S. PATENT DOCUMENTS

| | | | |
|---|---|---|---|
| 5,201,455 | * 4/1993 | Reynolds, Jr. et al. | 228/119 |
| 5,302,414 | 4/1994 | Alkhimov et al. | 427/192 |
| 5,571,431 | * 11/1996 | Lantieri et al. | 219/130.01 |
| 5,831,241 | * 11/1998 | Amos | 219/137 |
| 5,915,743 | * 6/1999 | Palma | 29/402.18 |
| 5,956,845 | * 9/1999 | Arnold | 29/889.1 |

OTHER PUBLICATIONS

A method of "cold" gas–dynamic deposition. Authors A.P. Alkhimov, V.V. Kosarev, and A.N. Papyrin; Dec. 1990; Sov. Phys. Doki 35(12).

* cited by examiner

Primary Examiner—Shrive Beck
Assistant Examiner—Jennifer Kolb

(57) ABSTRACT

A machine tool or die that is fabricated from thermally spray-formed steel is easily repaired by cleaning, roughing and covering the surface to be repaired by a cold-spray layer of metal and then forming a weldment by conventional electric welding processes. The repaired surface is then finished by conventional machining, grinding and polishing and then the tool is put back into service.

10 Claims, 1 Drawing Sheet

METHOD FOR REPAIRING SPRAY-FORMED STEEL TOOLING

BACKGROUND OF THE INVENTION

Co-pending application entitled "Method For Repairing Steel Spray-Formed Tooling With TIG Welding Process" by Pergande and Hussary having Ser. No. 09/415,974 is filed together herewith and assigned to the same assignee.

FIELD OF THE INVENTION

This invention relates in general to spray-formed steel tooling produced by thermal spray processes and more particularly to a method for repairing of such spray-formed steel tooling.

DESCRIPTION OF THE RELATED ARTS

Spray-formed tooling is fabricated by first creating a pattern of the desired tool using a free form fabrication technique. The pattern is then used to create a ceramic mold that is the inverse of the tool to be produced. The resulting ceramic mold is the receptor into which metal is sprayed to form a deposit in the shape of the desired tool.

At least one spray forming process is wire-arc spraying. In wire-arc spraying, electric current is carried by two electrically conductive, consumable wires with an electric arc forming between the wire tips. A high-velocity gas jet blowing from behind the moving wires strips away the molten metal that continuously forms as the wires are melted by the electric arc. The high-velocity gas jet breaks up or atomizes the molten metal into finer particles in order to create a fine distribution of molten metal droplets. The atomizing gas then accelerates the particles away from the electrode tips to the substrate surface where the molten particles impact the substrate to incrementally form a deposit in the shape of the tool.

The completed tool is then mounted and used to produce parts just like any other stamping, die casting, or molding process. There is concern about fatigue life because the porosity of the tool produced is five percent or more, but preliminary estimates of the fatigue life of these parts under load is 10,000 or more cycles which is acceptable for prototype tool applications.

Spray-forming of steel is used for rapid production of prototype and production steel tooling at considerable cost savings over the conventional production by machining and heat treatment of steel tooling for such applications as injection molding and stamping. Typically small sets of prototype permanent tooling can take from four to five months to fabricate, while large prototype tooling can take up to one year to fabricate. Spray-formed steel tooling has been produced in one month at costs substantially less than for permanent tooling.

Such spray-formed steel prototype tooling however, has a limited lifetime than its conventional machined steel counterpart, due, in part to the more granular nature of the thermally-sprayed steel, and generally lower overall strength of the sprayed material. Thus, spray-formed steel tooling may be expected to incur a greater need for repair during its useful lifetime and subsequent extension of lifetime through advanced surface repair processes. Typical tool repair involves arc welding new material on the tool, then machining and polishing the material to match the tool. However, the non-homogeneous nature of thermal spray-formed steel does not allow for the practice of common welding techniques used on tool steel unless the thermal spray-formed steel is heated to approximately 200° C. before welding and then cooled slowly to reduce cracking.

U.S. Pat. No. 5,302,414 entitled "Gas-Dynamic Spraying Method for Applying A Coating" was issued to Alkhimov et al. on Apr. 12, 1994. The method introduces particles of a powder into a gas. The particles are a metal, alloy, or a polymer. The gas and the particles are formed into a supersonic jet having a temperature low enough to prevent thermal softening of the particles. The jet is directed against an article of another material such as a metal, alloy or dielectric where the particles coat the article.

SUMMARY OF THE INVENTION

It is a principle advantage of the present invention to repair spray-formed steel tooling economically and without the need for highly experienced welding personnel.

It is another advantage of the present invention to be able to weld spray-formed steel tooling by conventional welding processes.

It is yet another advantage to avoid any gas release during repair from the spray-formed steel tooling that operates to weaken the repair.

These and other advantages are inherent in the following method for repairing thermal spray-formed tooling such as die pieces. The method has the steps of first cleaning the surface area to be repaired of dirt and impurities. Once the surface area is cleaned, it is then prepared to accept cold-gas spray coatings. Once the surface is cleaned and prepared, an intervening layer of low-carbon steel is deposited onto the repair surface by the process of cold spraying or cold gas-dynamic spraying to a predetermined thickness on the surface area to be repaired. Once the surface has a finite layer of cold-sprayed steel on the surface, a weldment is deposited on the surface by an electric welding process and the weldment is then finished to the desired surface by conventional machining, grinding and polishing.

BRIEF DESCRIPTION OF THE DRAWINGS

These and other advantages may be found in the detailed description taken in conjunction with the following drawings in which.

DETAILED DESCRIPTION OF THE PREFERRED EMBODIMENT

Figure 1:
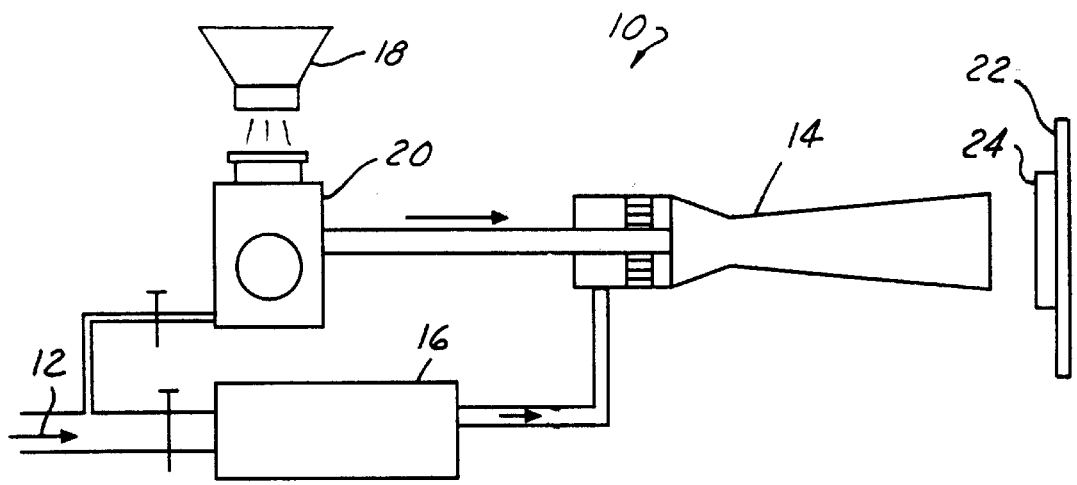
FIG. 1 is a schematic of a cold spray process as found in the prior art.

Referring to the drawings by the characters of reference there is illustrated in FIG. 1 the cold gas dynamic spray process 10 according to the prior art as found in U.S. Pat. No. 5,302,414. The method of the invention utilizes cold gas spraying of low-carbon iron or steel on thermal spray-formed steel tooling. The purpose of the cold gas spraying is to develop an intermediate layer capable of having a weldment formed by means of an electric welding process such as Gas-Metal Arc Welding, GMAW, or as is sometimes identified as Metal Inert Gas welding or MIG. In addition Tungsten Inert-Gas Welding is also used.

FIG. 1 illustrates schematically a simplified cold gas deposition system 10 according to the prior art. In this process, a stream of gas 12—predominantly air, nitrogen, helium or mixtures of the same, is accelerated through a converging-diverging nozzle 14, i.e., a DeLaval nozzle, so as to provide a supersonic gas stream. This may be achieved through pressurization and preheating in a heater 16 of the inlet gas stream. Solid particles are introduced from a hopper means 18 through a feeder 20 upstream of the nozzle 14 constriction under high pressure. The accelerated particles impact on a substrate surface 22 such as a tool and build a thick coating or layers 24 by a process of cold compaction. As an example, the cold gas-dynamic spray process has the capability to develop thick, 3–5 mm layers of Ancorsteel 1000 (Trademark of Hoeganaes Corp.) iron powder on the substrate 22 or tool.

In each case for building the weldment on the substrate 24 is by an electric welding process utilizes filler rods that are the common filler metals used for die repair and material build-up.

The spray-formed steel die piece or tool 22 to be repaired is first cleaned of any dirt or impurities 26. The surface 22 to be repaired is then prepared 28 for the acceptance of the cold gas-dynamic spray 30, or cold-spray, layer by means of grit blasting, electrical discharge machining, plasma torch cleaning or any of several surface preparation steps known to produce rough surfaces for acceptance of sprayed coatings. After the preparing of the surface 22, the prepared surface 23 receives a cold spray layer 24.

In addition it may be possible to develop a cold-spray layer in the absence of any special preparation steps, other than cleaning. This is so, since in the cold-spray process the material being sprayed or deposited forms a surface that allows the subsequent material to adhere due to the prior material being ballistically embedded in the surface of the substrate or more particularly the tool.

Figure 2:
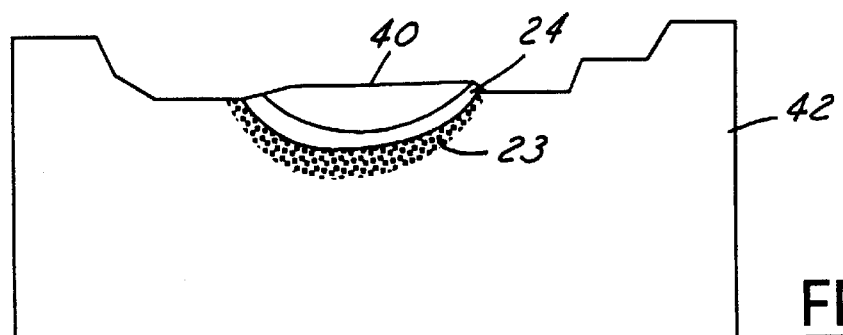
FIG. 2 is sectional view of a weld bead on a thermal sprayed steel tool.
Figure 3:
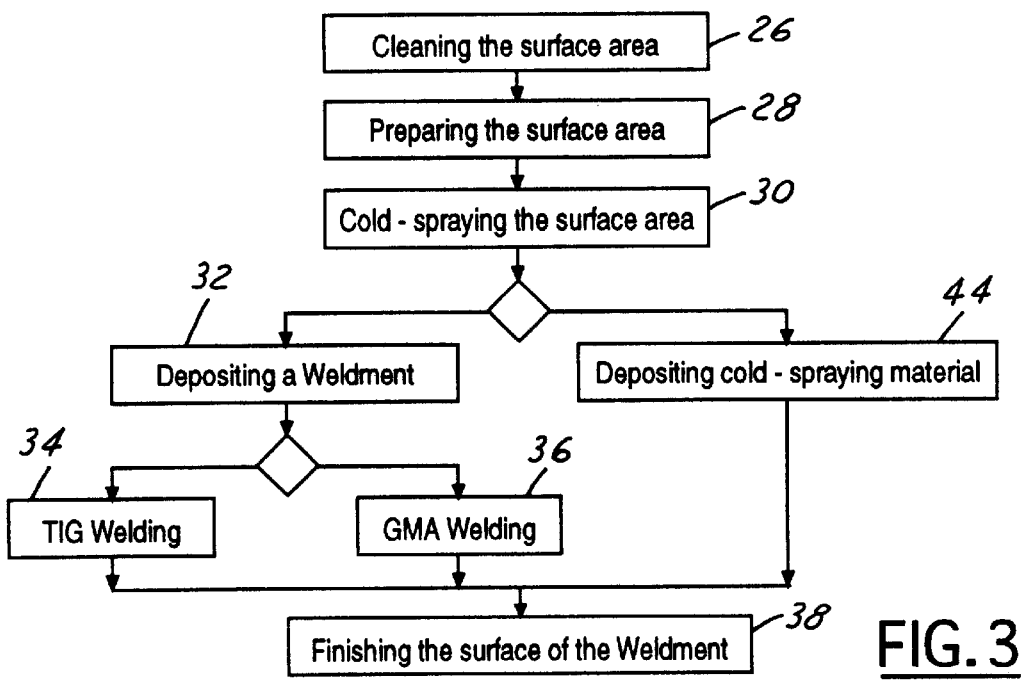
FIG. 3 is a flow chart for the method of repairing spray-formed steel.

In the schematic of FIG. 2, the intermediate layer 24 of the cold-spray material is normally developed to a thickness between 100 and 1000 micrometers using helium gas at the inlet gun pressure of 350 psi or 2.4 MPa at a temperature of 325° to 400° Centigrade. The optimum particle size of the iron powder in the feeder 20 is less than 45 micrometers average dimension and should be dry and generally free of gross surface oxidation. Once an intervening layer of high-purity iron on the substrate 22 or tool is developed by the cold-spray process, further build-up of the repair material may be effected by GMAW or TIG welding methods as are well known in the mold and die repair art.

Once the weldment 40 or repair is completed by the welding process such as TIG 34 or GMA 36, the surface is then finished 38 to the desired surface finish by convention machining, grinding and polishing. Then, the tool or die is ready to be put back in service.

As an example, a weldment 40 was made to a monolithic piece of cold-sprayed iron deposited under the above-described conditions. A TIG welder was used to develop a weld bead on the cold-sprayed steel using straight DC polarity with argon shielding gas. A mild steel filler rod was used with the amperage on the TIG welder varying between 35–70 amps. As alternative, the filler rod can be a nickel rod that is 99% nickel that is otherwise a 'pure' nickel rod.

Problems of porosity, oxidation and carbon content of the thermally spray-formed steel material of the tool insofar as weld-metal adherence, are effectively overcome by the intermediate layer 24 of high-purity, low-carbon, low-oxygen cold-spray material.

Referring to FIG. 2, the principal advantage of the cold-spray steel intermediate layer 24 is the capability for development of a superior weldment 40 built directly on the thermal spray-formed steel tooling 42. In an alternate embodiment, without the cold-spray steel layer, the spray-formed steel would have to be heated to approximately 200° C. before welding and then cooled slowly to reduce cracking. This preheating step has also proved damaging to the soldered water lines in finished tools and dies and as a result the preheating step may take several hours, even for a relatively small die such as one that is 2 feet square. In addition, this preheating step is complicated for spray-formed steel tools since the material has a thermal conductivity approximately thirty-three percent (33%) of wrought steel and heating too quickly can produce cracking in the tool. The economics of having the ability to weld repair a spray-formed steel tool without concerns of cracking permits a lower skilled welder to repair tools using the cold-spray weld process. In the process of this alternate embodiment, no preheating step is used.

The cold-spray steel layer has little porosity in contrast with the higher porosities of up to 10–15% volume for typical thermally spray-formed steel tooling. This internal porosity in the spray-formed steel tool is a source of additional gas release during conventional welding. This results in gas trapping in the repair weld bead or weldment and the resultant weakening of the repair. The normal solution of this condition is to grind the weld bead back to below the original surface, and re-weld until no further porosity is detected. This is not only a tedious process but also a process that is unpredictable.

As an alternative step 44, the cold-spray steel may have sufficient strength and with a microhardness of up to 190 Vickers, act as the repair material itself without the need for additional weld processing. Deposits of the cold-spray steel of up to 4 mm in thickness with favorable states of residual stress have been achieved. When using the cold-spray steel as the repair material, the cold-spray steel can be fused with an energy source such as a TIG torch with no filler rod. Other fusing energy sources are lasers, plasma torches, electron beams, to name but a few such energy sources.

There has thus been shown and described a process for repairing spray-formed steel tooling by forming a cold-spay surface on the tool and then welding the repair on such surface.

What is claimed is:

1. The method for repairing thermal spray-formed tooling comprises the steps of:
   cleaning the surface area to be repaired of dirt and impurities;
   preparing the surface area to be repaired to accept spray coatings;
   cold-spraying an initial layer of low-carbon steel to a predetermined thickness on the spray-formed tooling on the surface area to be repaired and then
   depositing by an electric welding process a weldment on the cold-spray layer.

2. The method of claim 1 additionally including the step of finishing the surface of the weldment.

3. The method of claim 1 additionally including the step of depositing a second cold-spray, low-carbon steel on the initial cold-spray layer prior to the step of depositing a weldment.

4. The method of claim 3 additionally including the step of fusing the second cold-spray layer with an energy source.

5. The method of claim 1 wherein the step of preparing the surface area to be repaired is by direct ballistic depositing cold-spray materials to accept the cold-spray coating layer.

6. The method of claim 1 wherein the predetermined thickness is approximately 1 mm.

7. The method of claim 3 wherein the step of depositing said second cold-sprayed, low-carbon steel is by depositing said steel to a thickness of approximately 5 mm.

8. The method of claim 1 wherein the step of depositing by an electric welding process a weldment on the cold-spray layer is by the Tungsten Inert-Gas welding process using a straight DC power polarity with a shielding gas of argon.

9. The method of claim 8 wherein the current range of the DC power is between 35 and 70 amperes.

10. The method of claim 1 wherein the step of depositing by an electric welding process a weldment on the cold-spray layer is by Gas Metal Arc welding process.

* * * * *